(12) United States Patent
Yamanaka et al.

(10) Patent No.: US 9,638,575 B2
(45) Date of Patent: May 2, 2017

(54) MEASURING APPARATUS, MEASURING SYSTEM, AND MEASURING METHOD

(71) Applicants: Yuji Yamanaka, Kanagawa (JP); Go Maruyama, Kanagawa (JP); Kensuke Masuda, Kanagawa (JP); Sho Nagai, Kanagawa (JP)

(72) Inventors: Yuji Yamanaka, Kanagawa (JP); Go Maruyama, Kanagawa (JP); Kensuke Masuda, Kanagawa (JP); Sho Nagai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/293,039

(22) Filed: Jun. 2, 2014

(65) Prior Publication Data
US 2014/0375994 A1 Dec. 25, 2014

(30) Foreign Application Priority Data

Jun. 19, 2013 (JP) ................................ 2013-128523
Dec. 11, 2013 (JP) ................................ 2013-256076
Apr. 7, 2014 (JP) ................................ 2014-078733

(51) Int. Cl.
*G01J 3/02* (2006.01)
*G01J 3/51* (2006.01)
(Continued)

(52) U.S. Cl.
CPC ............. *G01J 3/0208* (2013.01); *G01J 3/465* (2013.01); *G01J 3/513* (2013.01); *G01J 3/524* (2013.01)

(58) Field of Classification Search
CPC ............. G01J 3/465; G01J 3/513; G01J 3/524
See application file for complete search history.

(56) References Cited

U.S. PATENT DOCUMENTS 4,547,074 A * 10/1985 Hinoda et al. ................ 356/405
5,729,011 A * 3/1998 Sekiguchi ..................... 250/226
(Continued)

FOREIGN PATENT DOCUMENTS

JP        7-120324        5/1995
JP      2004-228662       8/2004
(Continued)

*Primary Examiner* — Kara E Geisel
*Assistant Examiner* — Shawn Decenzo
(74) *Attorney, Agent, or Firm* — Oblon, McClelland, Maier & Neustadt, L.L.P.

(57) ABSTRACT

A measuring apparatus and a measuring method are provided. The measuring apparatus includes an optical system to condense light, a light receiving device to receive light condensed by the optical system at a plurality of light receiving positions and convert the light into an electric signal, a plurality of optical band-pass filters arranged near a lens stop of the optical system, each of the optical band-pass filters having a different spectral transmittance, a lens array arranged between the optical system and the light receiving device, the lens array having a plurality of lenses each of which is arranged substantially in parallel with a two-dimensional surface of the light receiving device, and a correction unit to correct the electric signal for each one of the plurality of light receiving positions of the light receiving device. The measuring method is performed by the measuring apparatus.

17 Claims, 12 Drawing Sheets

(51) Int. Cl.
    *G01J 3/46*         (2006.01)
    *G01J 3/52*         (2006.01)

(56) References Cited

U.S. PATENT DOCUMENTS

| | | | |
|---|---|---|---|
| 9,137,441 B2* | 9/2015 | Shroff | H04N 5/2254 |
| 2011/0090379 A1* | 4/2011 | Koizumi | 348/242 |
| 2011/0249116 A1* | 10/2011 | Yamagishi | G01J 3/465 348/135 |
| 2012/0014571 A1* | 1/2012 | Wong | G01J 3/46 382/128 |
| 2012/0127351 A1* | 5/2012 | Vlutters et al. | 348/266 |
| 2013/0250299 A1* | 9/2013 | Weng et al. | 356/402 |
| 2014/0055784 A1* | 2/2014 | Kremer | G01J 3/2823 356/302 |
| 2014/0078379 A1 | 3/2014 | Masuda et al. | |
| 2014/0098212 A1 | 4/2014 | Yamanaka et al. | |

FOREIGN PATENT DOCUMENTS

| | | |
|---|---|---|
| JP | 2005-257827 | 9/2005 |
| JP | 2007-192729 | 8/2007 |
| JP | 2007-317750 | 12/2007 |
| JP | 2010-271246 | 12/2010 |
| JP | 2013-501930 | 1/2013 |
| WO | WO 2011/018749 A1 | 2/2011 |

\* cited by examiner

MEASURING APPARATUS, MEASURING SYSTEM, AND MEASURING METHOD

CROSS-REFERENCE TO RELATED APPLICATIONS

This patent application is based on and claims priority pursuant to 35 U.S.C. §119(a) to Japanese Patent Application Nos. 2013-128523, filed on Jul. 19, 2013, 2013-256076, filed on Dec. 11, 2013, and 2014-078733, filed on Apr. 7, 2014, in the Japan Patent Office, the entire disclosure of which is hereby incorporated by reference herein.

BACKGROUND

Technical Field

Example embodiments of the present invention generally relate to a measuring apparatus, a measuring system, and a measuring method.

Background Art

Conventionally, colorimeters and luminance meters are known to measure the luminance or chromaticity of the light emanating from an object. For example, so-called XYZ cameras that use optical band-pass filters are known. The optical band-pass filters can deal with the color matching functions of the XYZ colorimetric system defined by the International Commission on Illumination (Commission International de L'Eclairage (CIE)). It is known that human retina cells have a sensing system that senses R (red), G (green), and B (blue) of the light reflected from an object, and the retina cells transmit signals that correspond to the intensity of the sensed R, G, and B of the light to a brain. The brain perceives the color of an object from the ratio of the received signals. The sensitivity of the sensing system that senses R, G, and B has the characteristics called color matching functions.

The values in the spectral distribution of the light that is reflected at an object and received by human eyes are multiplied by color matching functions, and the integrated values X, Y, and Z of the obtained values are referred to as tristimulus values. Human eyes sense colors depending on the magnitude of those tristimulus values. When the stimulus magnitude of X is greater than the stimulus magnitude of Y and Z, the color of an object is perceived as red. When the stimulus magnitude of Y is greater than the stimulus magnitude of X and Z, the color of an object is perceived as green. In a similar manner, when the stimulus magnitude of Z is greater than the stimulus magnitude of X and Y, the color of an object is perceived as blue.

SUMMARY

Embodiments of the present invention described herein provide a measuring apparatus and a measuring method. The measuring apparatus includes an optical system to condense light, a light receiving device to receive light condensed by the optical system at a plurality of light receiving positions and convert the light into an electric signal, a plurality of optical band-pass filters arranged near a lens stop of the optical system, each of the optical band-pass filters having a different spectral transmittance, a lens array arranged between the optical system and the light receiving device, the lens array having a plurality of lenses each of which is arranged substantially in parallel with a two-dimensional surface of the light receiving device, and a correction unit to correct the electric signal for each one of the plurality of light receiving positions of the light receiving device. The measuring method is performed by the measuring apparatus, and the measuring method includes obtaining capture data from the light receiving device, and correcting the capture data for each one of the plurality of light receiving positions of the light receiving device.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 20A is a front view and FIG. 20B is a side view of the measuring apparatus.

Figure 1:
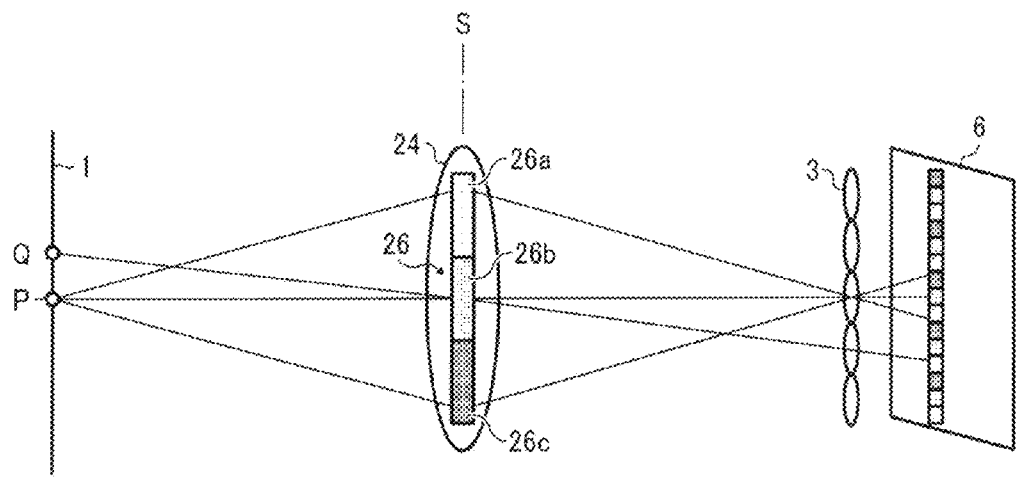
FIG. 1 is a schematic diagram illustrating the principles of a measuring apparatus according to the first embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits (ASICs), field programmable gate arrays (FPGAs) computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Example embodiments of the present invention will be described below with reference to the drawings. The first embodiment is described with reference to FIGS. 1 to 13. Before describing the structure of a measuring apparatus 10 according to the first embodiment in detail, the principles of the measuring apparatus according to the first embodiment is described with reference to FIG. 1. For the purposes of simplification, a main lens 24 that serves as an optical system is illustrated as a single lens, and the stop position S of the main lens is illustrated as the center of a single lens.

At the center of the main lens 24, a color filter 26 is provided as an optical band-pass filter. The color filter 26 is a filter that is capable of processing tristimulus values of color having the spectral transmittance that is based on the color matching functions of the XYZ colorimetric system. More specifically, the color filter 26 includes a plurality of color filters where the spectral transmittance is different from each other among the color filters based on the color matching functions of the XYZ colorimetric system. In the first embodiment, the color filter 26 includes color filters 26a, 26b, and 26c.

The term "a plurality of optical band-pass filters having different spectral transmittance" according to an example embodiment of the present invention does not only indicate the combination of a plurality of filters each of which has different spectral transmittance, but also indicates that each filter changes its spectral transmittance on an area-by-are basis.

In actuality, a color filter is not arranged inside the lens. The color filter 26 is arranged near the stop of the main lens 24. The expression "near the stop" means a portion through which light beams with various angles of view can pass, and includes the stop position. In other words, the expression "near the stop" means a permissible range in which the color filter 26 is provided for the main lens 24.

Figure 2:
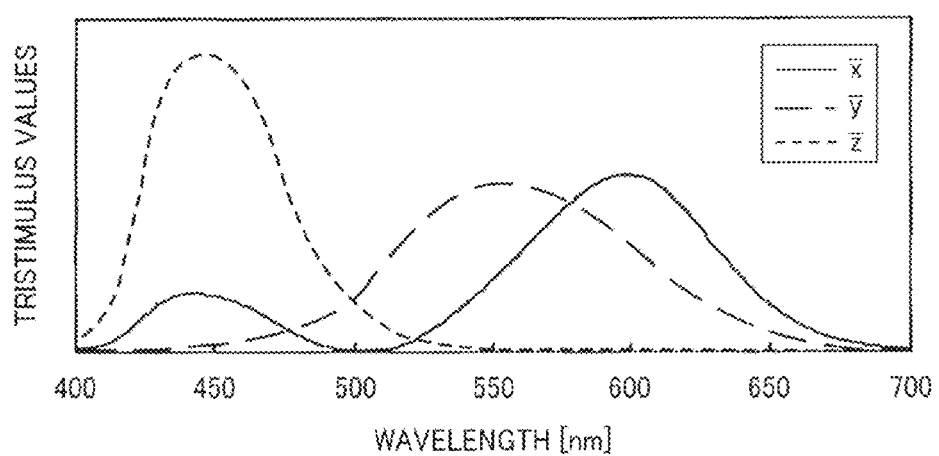
FIG. 2 depicts the characteristics of the color matching functions of the XYZ colorimetric system defined by the CIE.
Figure 3:
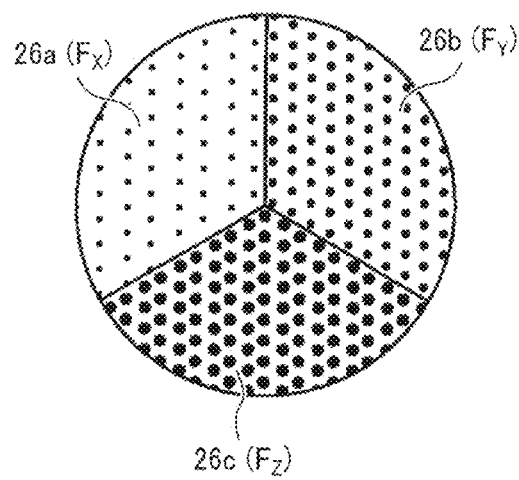
FIG. 3 depicts a geometric arrangement of a color filter according to an example embodiment of the present invention.

FIG. 3 depicts a geometric arrangement of the color filter 26 according to an example embodiment of the present invention. In FIG. 3, the color filter 26 is divided into three fan-shaped regions whose sizes are approximately equal to each other. However, the shape of the color filter 26 is not limited to the shape depicted in FIG. 3. The color filter 26 may have a shape other than a circular shape, and may be divided into rectangular regions. Moreover, the dimensions of the divided regions of the filter are not necessarily equal to each other. FIG. 2 depicts the characteristics of the color matching functions of the XYZ colorimetric system defined by the CIE. As seen from FIG. 2, the area formed by the line of color matching function of Z is smaller than the areas formed by the lines of the other color matching functions. The size of such areas correlate with the size of a signal-to-noise ratio (S/N ratio). In order to increase the S/N ratio, the dimension of the color filter 26c that corresponds to z may be made greater than the other regions.

Figure 4:
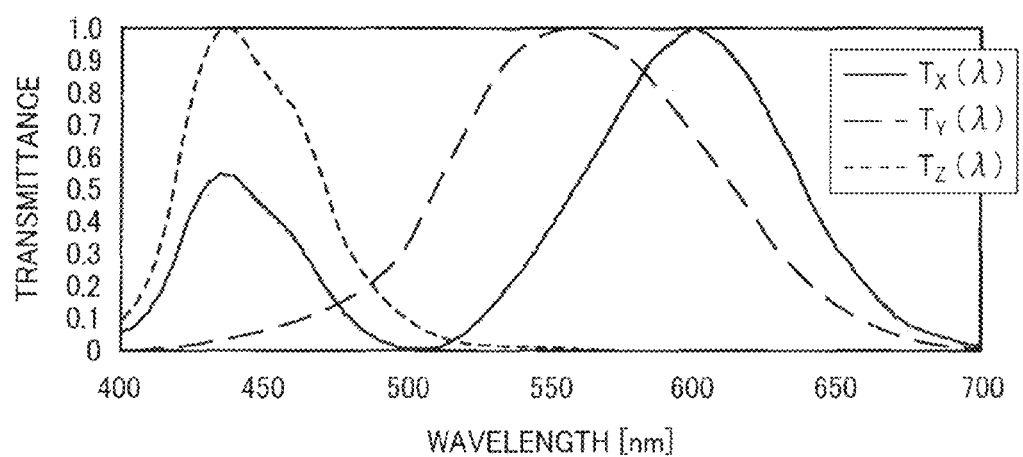
FIG. 4 depicts the spectral transmittance of color filters where the angle of incidence of light beam is 0 degree, according to an example embodiment of the present invention.

FIG. 4 depicts the spectral transmittance of color filters where the angle of incidence of light beam is 0 degree, according to an example embodiment of the present invention. In FIG. 4, the solid line, broken line, and dotted line indicate the spectral transmittance $T_X(\lambda)$, $T_Y(\lambda)$, and $T_Z(\lambda)$ of the color filters $26a(F_X)$, $26b$ $(F_Y)$, and $26c(F_Z)$, respectively, based on the color matching functions depicted in FIG. 2.

Next, the determination processes of the spectral transmittance of $T_X(\lambda)$, $T_Y(\lambda)$, and $T_Z(\lambda)$ are described. The spectral transmittance of FIG. 4 is determined by the color matching functions $\bar{x}(\lambda)$, $\bar{y}(\lambda)$, and $\bar{z}(\lambda)$ defined by the CIE-1931 colorimetric system and the spectral transmittance $T_L(\lambda)$ of the optical system excluding the filters provided for lenses, and by the spectral sensitivity S(λ) of the light receiving elements. Accordingly, intermediate results T'$_X$(λ), T'$_Y$(λ), and T'$_Z$(λ) are expressed as follows.

$$T'_X(\lambda) = \bar{x}(\lambda) / \{S(\lambda) T_L(\lambda)\} \quad \text{[Formula 1]}$$

$$T'_Y(\lambda) = \bar{y}(\lambda) / \{S(\lambda) T_L(\lambda)\} \quad \text{[Formula 2]}$$

$$T'_Z(\lambda) = \bar{z}(\lambda) / \{S(\lambda) T_L(\lambda)\} \quad \text{[Formula 3]}$$

Figure 5:
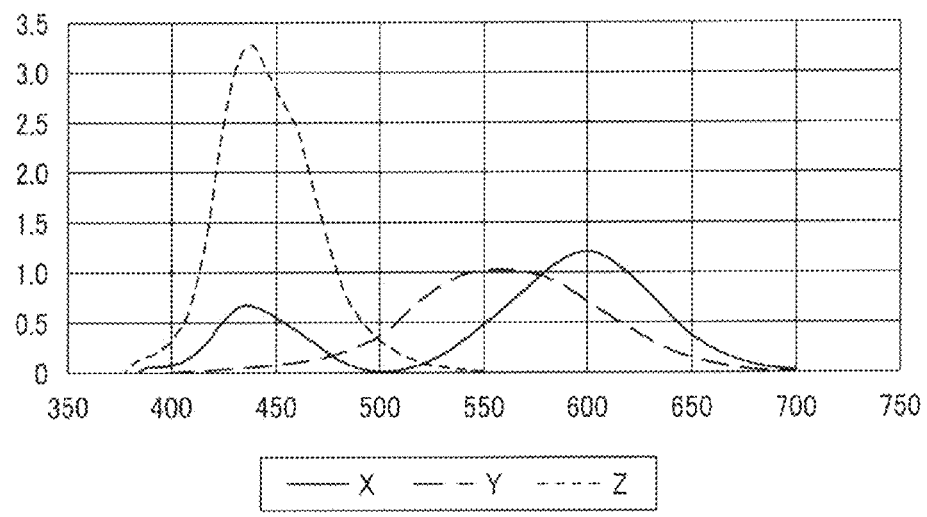
FIG. 5 is a graph of intermediate results of the determination processes of spectral transmittance, according to an example embodiment of the present invention.

FIG. 5 is a graph of intermediate results of the determination processes of spectral transmittance, according to an example embodiment of the present invention. In particular, FIG. 5 is a graph of T'$_X$(λ), T'$_Y$(λ), and T'$_Z$(λ).

As the sensors have spectral sensitivity, in Formulas 1, 2, and 3, the nonuniformity of the spectral sensitivity is corrected by S(λ). In FIG. 4, T$_X$(λ), T$_Y$(λ), and T$_Z$(λ) indicate the standardized maximum values of Formulas 1, 2, and 3, with the transmittance being 100%. Due to the standardization, the S/N ratio of the color filters that correspond to, in particular, $_X$(λ) and $_Y$(λ), is improved. According to the color filters described above, the inverse operation to the standardization of maximum values produces X, Y, and Z (tristimulus values) when light receiving elements receive the light beam that has passed through those color filters.

Figure 6:
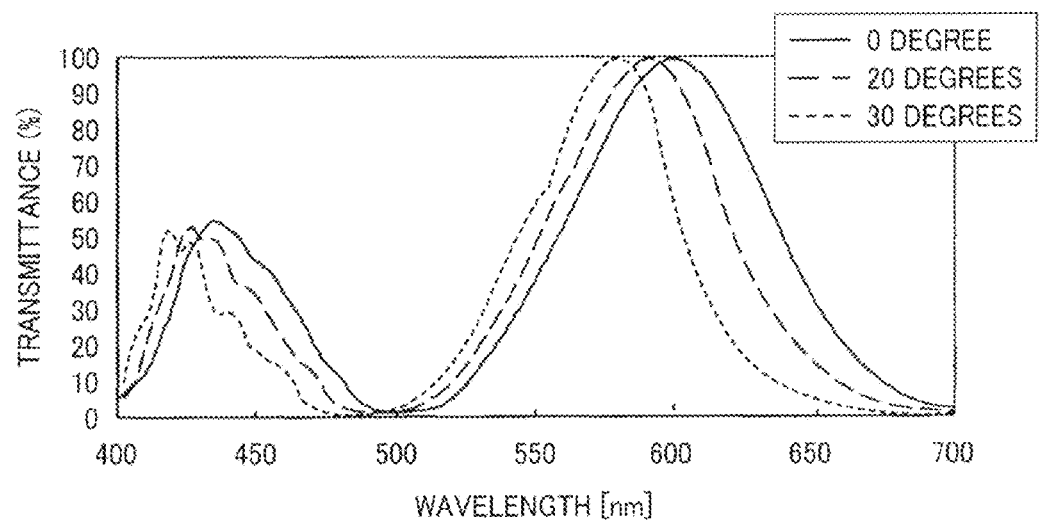
FIG. 6 depicts the dependence of the spectral transmittance of a color filter on the angle of incidence, according to an example embodiment of the present invention.

T$_X$(λ), T$_Y$(λ), and T$_Z$(λ) have complicated waveforms, but may be generated with values that are close to design values. Moreover, T$_X$(λ), T$_Y$(λ), and T$_Z$(λ) may be formed by a dielectric multilayer film. The multilayer film has optically interfering properties, and serves as a band-pass filter. Because the band-pass capability is realized by interference, the spectral transmittance of the color filters is theoretically dependent on the angle of incidence of the light beam. FIG. 6 depicts the dependence of the spectral transmittance of the color filter 26$a$(F$_X$) on the angle of incidence, according to an example embodiment of the present invention. In FIG. 6, the solid line, broken line, and dotted line indicate the spectral transmittance with the angle of incidence of 0, 20, and 30 degrees, respectively. It is seen that as the angle of incidence becomes greater, the transmission band shifts to the short wavelength side.

As illustrated in FIG. 1, a microlens array (MLA) 3 including a plurality of microlenses (small lenses) is arranged near the position at which the light from the main lens 24 is focused. On an image surface 6, a light receiving element array is arranged that serves as a light receiving device to convert the light gathered by the main lens 24 into electronic data (i.e., electric signal). The light receiving element array includes a plurality of light receiving elements (sensors). Hereinafter, the image surface 6 is also referred to as the light receiving element array 6. The ratio of the diameter of a microlens of the MLA 3 to the size of each light receiving element of the light receiving element array 6 is approximately 30:1 to 2:1.

Figure 7:
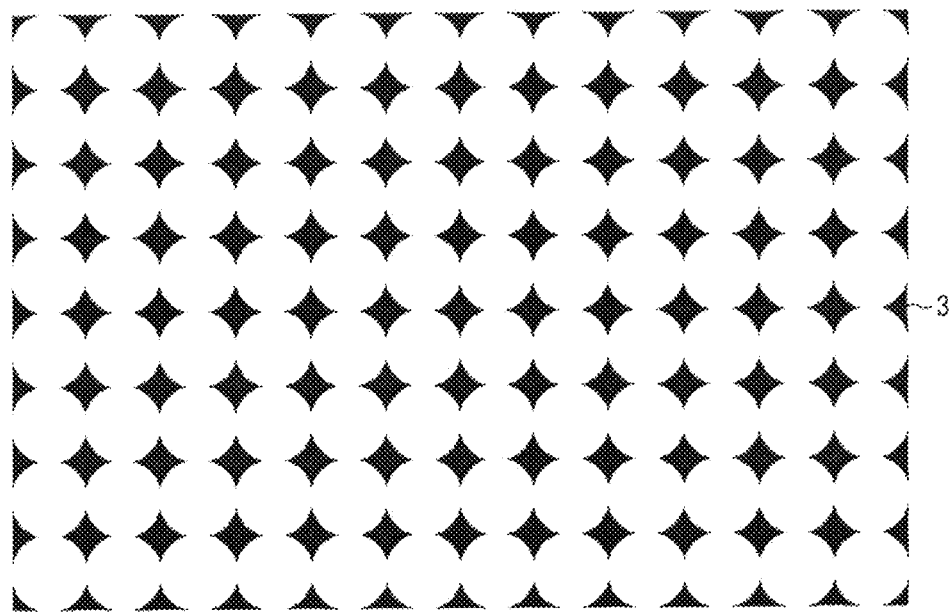
FIG. 7 illustrates a lens array viewed from the direction of an optical axis, according to an example embodiment of the present invention.

FIG. 7 illustrates the MLA 3 viewed from the direction of the optical axis, according to an example embodiment of the present invention. In FIG. 7, the white circles indicate lenses, and the black portions indicate light shielding elements. In other words, the portions excluding the lenses in the lens array are shielded by the light shielding elements. The light shielding elements according to the present example embodiment are evaporated chromium oxide. The light shielding elements may be a flat portion with no curvature or an area where the curvature does not meet a design value when manufactured. Because the light from such a portion or area as described above may carry an undesired light beam to light receiving elements, the light from such a portion or area should be blocked to obtain an electric signal that is predicted from the design. This configuration is desirable to obtain a precise measurement value.

The light receiving element array 6 is a monochrome sensor for which color filters are not provided on a pixel-by-pixel basis. Hereinafter, a light receiving element array is also referred to as a monochrome sensor. Only the light flux that has entered an aperture of the main lens 24 and passed through a stop is measured as the light from the object 1. The light flux that has entered the main lens 24 is a set of a number of light beams, and each of the light beams passes through a different position of the stop of the main lens 24. In the present example embodiment, the color filters 26$a$, 26$b$, and 26$c$ are provided at three stop positions of the main lens 24, and thus the light beams pass through the color filters 26$a$, 26$b$, and 26$c$ that have different spectral transmittance. Here, the angle of the light beam that enters a filter surface varies depending on the height of an object. Such a variation is seen from FIG. 1 where the two main light beams of the light flux originated from two points P and Q on the object 1 pass through the stop of the main lens 24 with different angles.

The light beams that have passed through the color filter 26 form an image near the MLA 3, but then reach different positions of the sensor. In other words, the positions on the surface of sensors (i.e., light receiving positions) correspond to the surfaces of the filters through which light beams have passed. Accordingly, it becomes possible to measure tristimulus values X, Y, and Z that are obtained by dividing the light originated from a certain point of the object 1 into three based on the wavelength of the light. However, as explained above with reference to FIG. 6, the spectral transmittance of the color filter 26 has dependence on the angle of incidence. For this reason, the direct use of the output of light receiving elements may lead to precise measurement of the tristimulus values X, Y, and Z of a two-dimensional surface that includes an optical axis thereon, but does not lead to precise measurement of the tristimulus values X, Y, and Z of a two-dimensional surface that does not include an optical axis. In other words, for example, even if the different points P and Q on the object 1 of FIG. 1 have the same color, the values output from the light receiving elements are different between the points P and Q because the light originated from each of the points P and Q has a different angle of incidence with reference to the filter 26.

In the first embodiment, correction processes are performed for every light receiving position with a reference value and a value calculated from a value output from a measuring apparatus, in order to obtain precise tristimulus values of a two-dimensional surface. Generally, such a method is referred to as multiple regression analysis. In multiple regression analysis, an explanatory variable and a target variable are prepared in advance, and correcting processes are performed with a regression matrix obtained from the explanatory variable and target variable. The procedure for such correction processes are described below in detail. Firstly, the procedure for calculating a value output from a measuring apparatus is described. This procedure corresponds to the procedure for calculating an explanatory variable in the multiple regression analysis.

Figure 8:
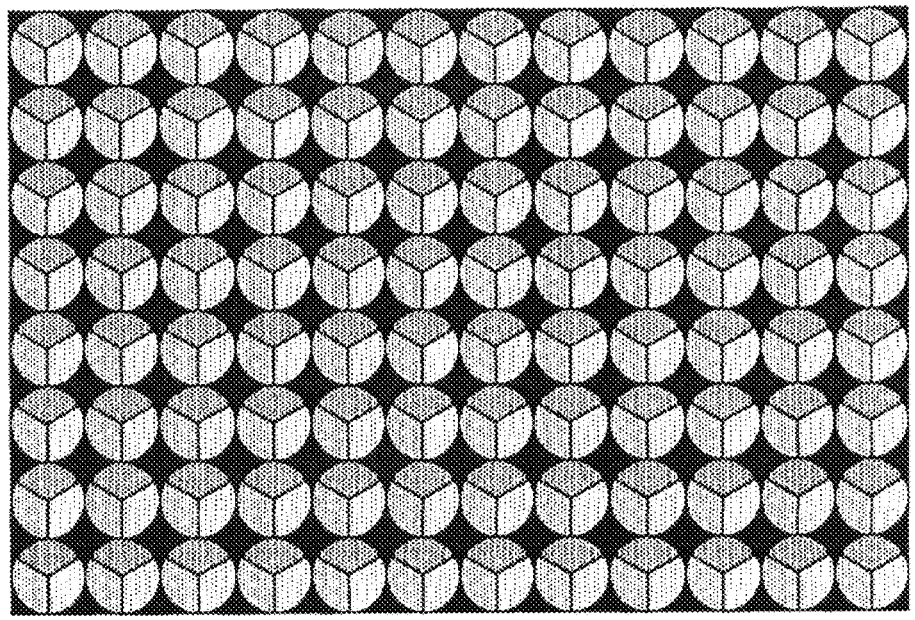
FIG. 8 is a plan view of an image captured by the measuring apparatus of FIG. 1.
Figure 9:
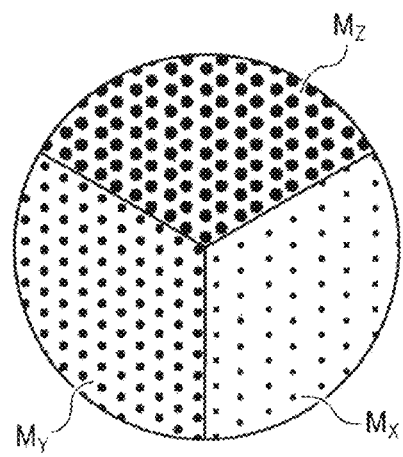
FIG. 9 is a magnified view of a macro pixel that is a part of the image illustrated in FIG. 8.

An image captured by the measuring apparatus of FIG. 1 consists of small circles as illustrated in FIG. 8. The image consists of circles because the shape of the stop of a single lens (i.e., main lens) is circular. Each of the small circles is herein referred to as a macro pixel. Each macro pixel is formed directly behind each of the lenses that configures a lens array. The inner structure of a macro pixel corresponds to the structure of the color filter illustrated in FIG. 3. FIG. 9 is a magnified view of a macro pixel, according to an example embodiment of the present invention. The macro pixel in FIG. 9 is reversed left to right and bottom to top with reference to the arrangement depicted in FIG. 3 because the light beam has passed through an optical system. However, the relationship is dependent upon an optical system, and the relationship is not limited to the example described above.

Inner structures $M_X$, $M_Y$, and $M_Z$ of a macro pixel are formed when the light that has passed through inner structures $F_X$, $F_Y$, and $F_Z$ of the color filter 26 reaches the light receiving element array 6. It is assumed that the value output from the light receiving elements of the inner structures $M_X$, $M_Y$, and $M_Z$ is expressed as follows. $v=[v_X, v_Y, v_Z]^t$. "t" indicates the transpose of a matrix. $v_X$, $v_Y$, and $v_Z$ indicate the outputs of the inner structures $M_X$, $M_Y$, and $M_Z$, respectively. The output value may be obtained by calculating the mean value of the inner structures $M_X$, $M_Y$, and $M_Z$, or may be obtained by selecting one of the light receiving elements of the inner structures $M_X$, $M_Y$, and $M_Z$ and adopting the output value of the selected light receiving element as a representative value.

Figure 10:
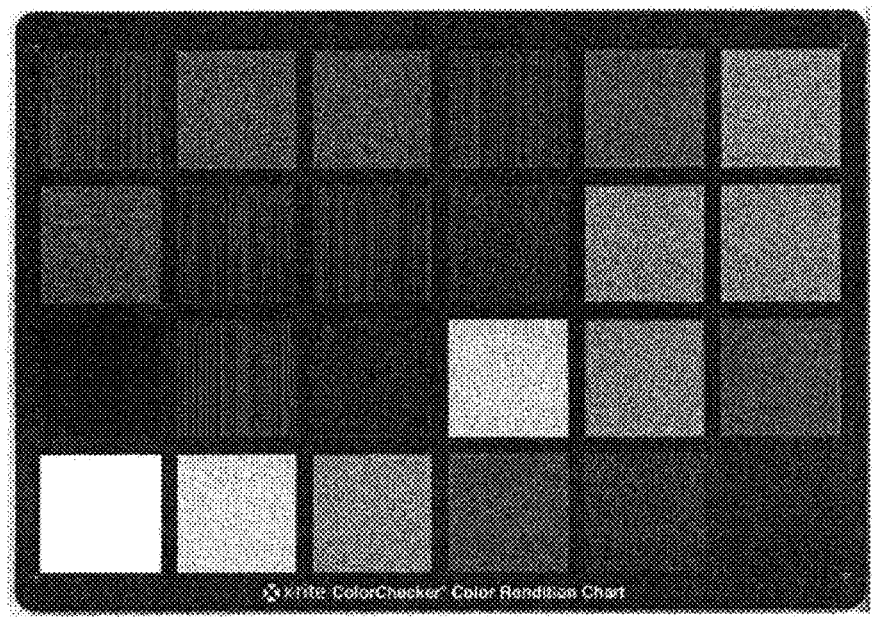
FIG. 10 illustrates a color checker that serves as a color sample, according to an example embodiment of the present invention.
Figure 11:
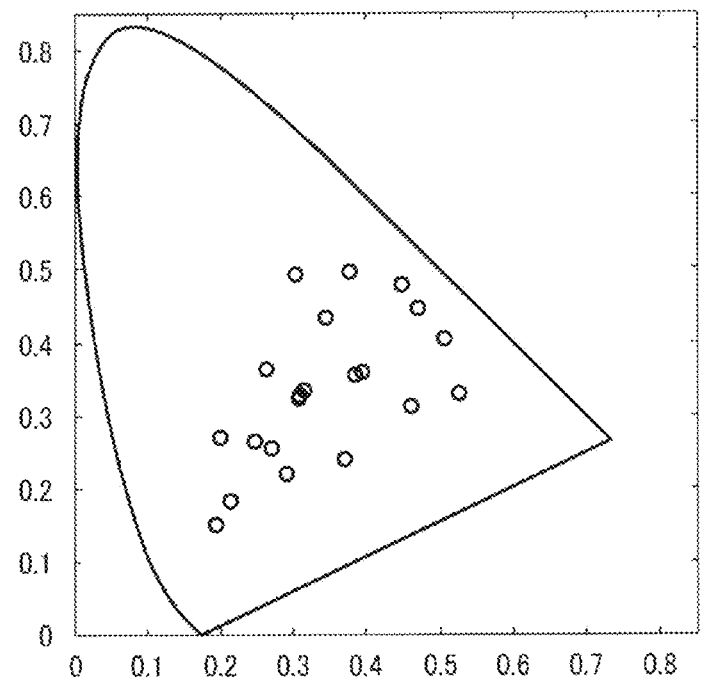
FIG. 11 depicts a result of plotting the measured values of the twenty-four colors included in the color checker on an xy-chromaticity diagram.

Next, a method of obtaining a reference value is described. This procedure corresponds to the procedure for calculating a target variable in the multiple regression analysis. A color sample that covers a wide range of color space is measured by a device such as a spectroscope for measuring X, Y, and Z values, and these measured values are used as reference values. As a color sample, for example, a so-called color checker on which rectangular twenty-four color samples are arranged is widely adopted. FIG. 10 illustrates a color checker according to an example embodiment of the present invention. FIG. 11 depicts a result of plotting the measured values of the twenty-four colors included in the color checker on an xy-chromaticity diagram.

The color sample is not limited to a color checker. If the objects to be measured are known, colors similar to those of these objects may be adopted as reference values. By so doing, a more accurate result of correction can be obtained. It is assumed that the reference values of X, Y, and Z (tristimulus values) for a certain color sample are expressed as follows. $r=[r_X, r_Y, r_Z]^t$.

Next, the flow of correcting processes is described. Firstly, a color sample is measured by using a reference measuring device other than the measuring apparatus according to the present example embodiment, and a reference value is then obtained. When a color checker with twenty-four colors is used as a color sample, numbers are assigned to these colors. For example, it is assumed that a reference value for the first color is obtained as follows. $r_1=[r_{1X}, r_{1Y}, r_{1Z}]^t$. In a similar manner, values for $r_1$ to $r_{24}$ are obtained. It is assumed that $R=[r_1, \ldots, r_{24}]$, where R indicates a matrix of 3 rows and 24 columns. Note that "R" serves as a target variable.

Next, a color sample is captured by the measuring apparatus of FIG. 1 to obtain capture data. The capture data is obtained such that one color sample is included in the image. Then, tristimulus values $v=[v_X, v_Y, v_Z]$ are obtained for the one color sample, for every one of the ninety-six macro pixels illustrated in FIG. 8. In a similar manner to the reference values, $V=[v_1, \ldots, v_{24}]$ that correspond to the twenty-four colors of the color sample is obtained for each of the macro pixels. Note that "V" serves as an explanatory variable. Then, a matrix G is obtained as below from R and V that have been obtained as above.

$$G=RV^t(VV^t)^{-1} \quad \text{[Formula 4]}$$

"G" is also referred to as a regression matrix, and is used for correcting processes. As V has a different value for each of the macro pixels, G is also calculated for each of the macro pixels. Up to this point, the preparation for correcting processes has been described.

The flow of actual measuring processes are described below. Firstly, an object to be measured is captured by using the measuring apparatus according to the present example embodiment. Then, an output value for each of the macro pixels included in the captured image is obtained as follows.

$$v_C=[v_{CX}, v_{CY}, v_{CZ}]^t$$

Next, corrected tristimulus values $r_C$ are obtained as in the formula below.

$$r_C=G\,v_C \quad \text{[Formula 5]}$$

Precise tristimulus values on a two-dimensional surface can be obtained by obtaining $r_C$ for each of the macro pixels.

In the flow described above, V or $v_C$ in which output values are directly used are adopted. However, such as extension as below is also possible.

$$v=[v_X, v_Y, v_Z, 1, v_X^2, v_Y^2, v_Z^2, \ldots]^t \quad \text{[Formula 6]}$$

" . . . " indicates higher-order terms such as $v_X v_Y$ and $v_X^3$. Such an extension may increase the precision of correction, and such increased precision may lead to more accurate values. When a regression matrix G is obtained by using the extended V, the extended $v_C$ is to be used even when Formula 5 is actually used.

Figure 12:
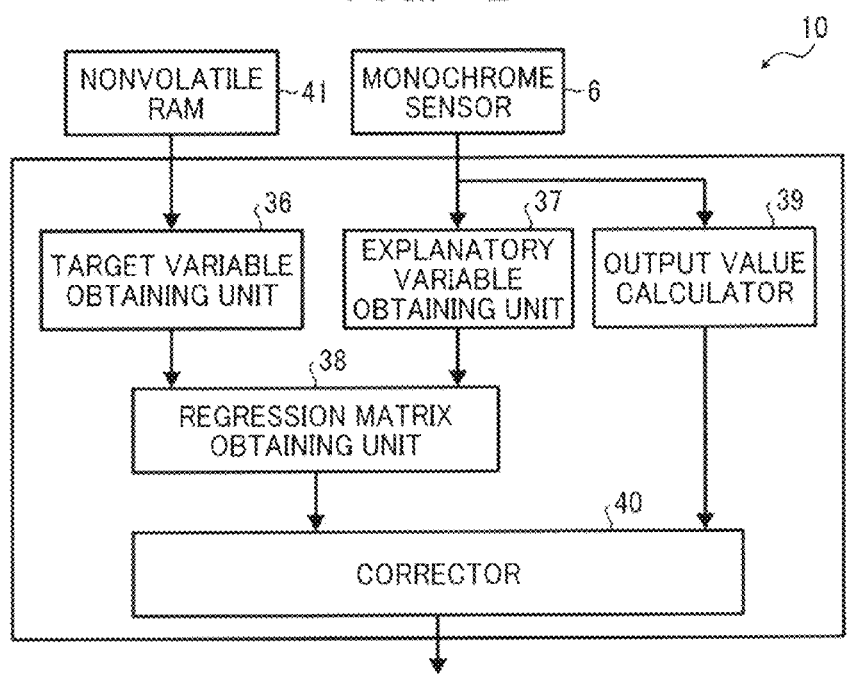
FIG. 12 is a schematic block diagram illustrating a functional structure of a measuring apparatus, according to an example embodiment of the present invention.

FIG. 12 is a schematic block diagram illustrating a functional structure of the measuring apparatus 10, according to the present example embodiment of the present invention. The measuring apparatus of FIG. 12 includes a target variable obtaining unit 36, an explanatory variable obtaining unit 37, a regression matrix obtaining unit 38, an output value calculator 39, and a corrector 40. The target variable obtaining unit 36 obtains a target variable R that is obtained by using a reference measuring device other than the measuring apparatus of FIG. 12. The explanatory variable obtaining unit 37 captures a color sample by using the monochrome sensor 6 of the measuring apparatus 10 to obtain an explanatory variable V. The regression matrix obtaining unit 38 obtains a regression matrix G from a target variable and explanatory variable, and the output value calculator 39 calculates an output value $v_C$ of each of the macro pixels based on the image of an object captured by the measuring apparatus 10. The corrector 40 obtains corrected tristimulus values $r_C$ from the regression matrix G and the output value $v_C$. The target variable measured by the reference measuring device is stored in the nonvolatile random access memory (RAM) 41.

Figure 13:
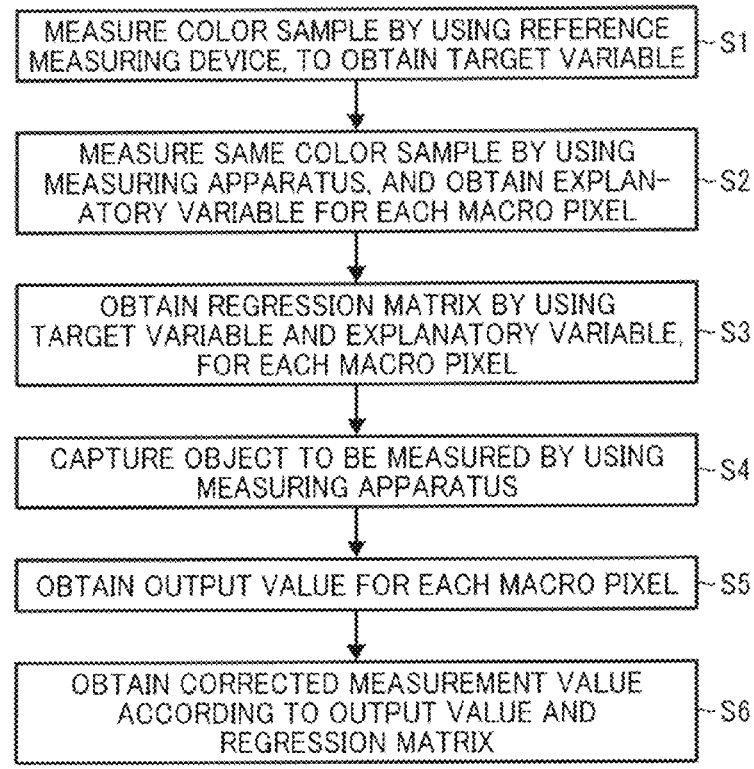
FIG. 13 is a flowchart of processes performed by the measuring apparatus of FIG. 12.

FIG. 13 is a flowchart of the processes performed by the measuring apparatus 10 of FIG. 12. Firstly, a color sample is measured by using a measuring device (i.e., reference measuring device), and a target variable is obtained by the target variable obtaining unit 36 (S1). Next, a same-color sample is measured by using the measuring apparatus 10, and an explanatory variable is obtained by the explanatory variable obtaining unit 37 for each macro pixel (S2). A regression matrix is obtained by the regression matrix obtaining unit 38 based on the obtained target variable and explanatory variable, for each macro pixel (S3). Next, an object to be measured is captured by the measuring apparatus 10 (S4), and an output value is calculated by the output value calculator 39 for each macro pixel (S5). A corrected measurement value is obtained by the corrector 40 according to the obtained output value and regression matrix (S6). According to the measuring method described above, the color of a two-dimensional surface can instantly and precisely be measured.

Figure 14:
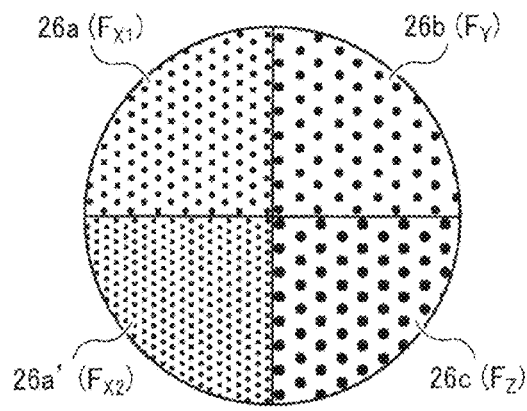
FIG. 14 depicts a geometric arrangement of color filters according to the second example embodiment of the present invention.

The second embodiment is described with reference to FIGS. 14 to 19. In the description of the second embodiment referring to FIGS. 14 to 19, like reference signs are given to elements similar to those described in the first embodiment of FIGS. 1 to 13. Overlapping description is omitted, and only elements that are different are described. In the present example embodiment, four color filters are provided at the center of a single lens that are capable of dealing with tristimulus values of color having the spectral transmittance that is based on the color matching functions of the XYZ colorimetric system. FIG. 14 depicts a geometric arrangement of color filters according to the second example embodiment of the present invention. The color filter 26 includes color filters 26a($F_{X1}$), 26a'($F_{X2}$), 26b($F_Y$), and 26c ($F_Z$). Hereinafter, the color filters 26a($F_{X1}$), 26b($F_Y$), and 26c($F_Z$) are abbreviated to $F_{X1}$, $F_Y$, and $F_Z$, respectively. Moreover, the color filters 26a($F_{X1}$), 26a'($F_{X2}$), 26b($F_Y$), and 26c($F_Z$) are abbreviated to x1, x2, Y, and z, respectively.

Figure 15:
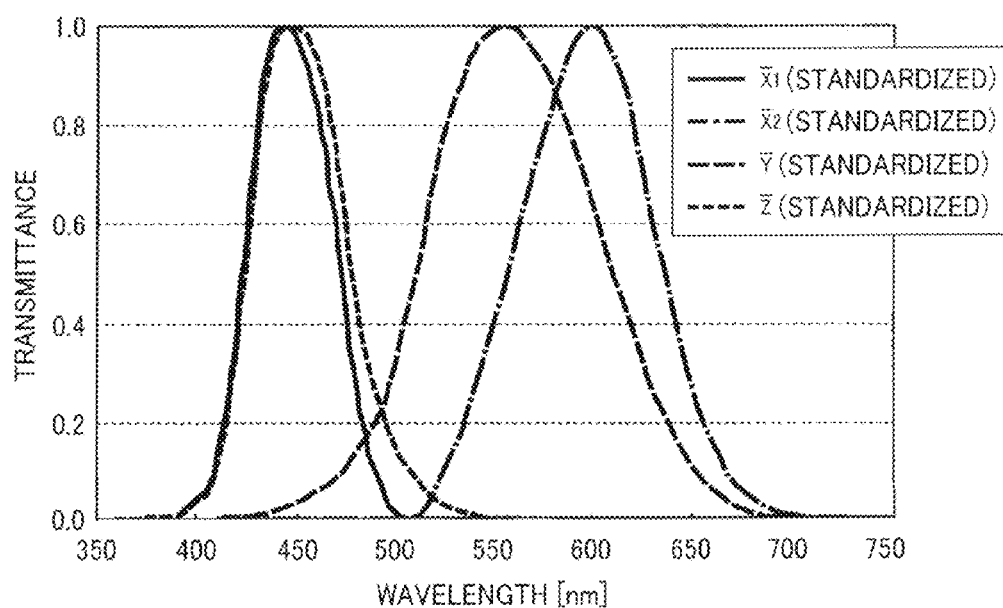
FIG. 15 depicts the spectral transmittance of color filters according to the second example embodiment of the present invention.
Figure 16:
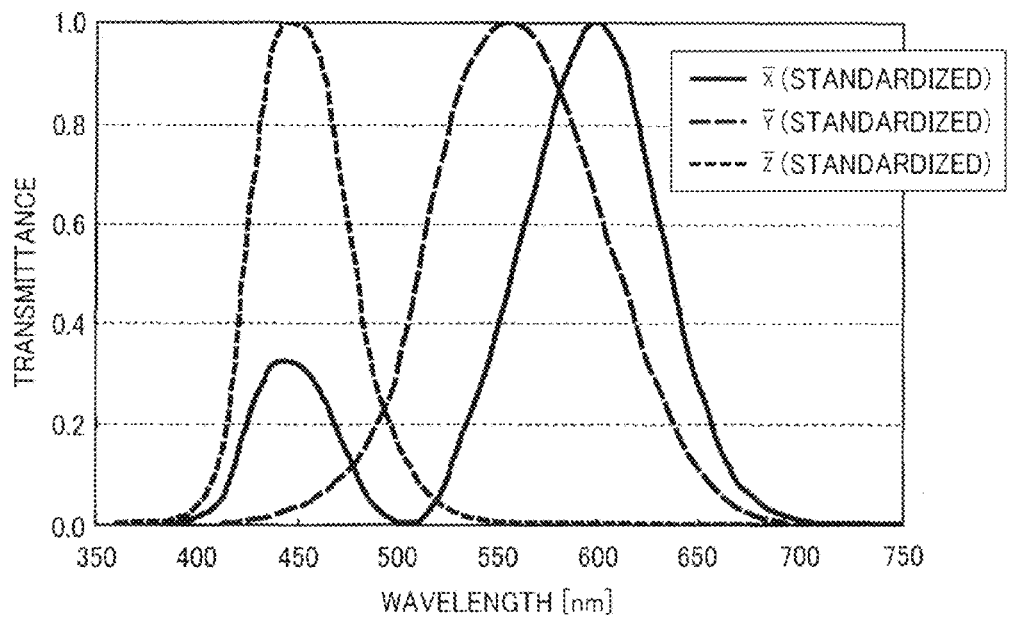
FIG. 16 illustrates the spectral transmittance of color filters where the peak values of color matching functions are normalized.

FIG. 15 depicts the spectral transmittance of the color filters where the angle of incidence of light beam is 0 degree. For comparison purposes, FIG. 16 illustrates the spectral transmittance of the color filters where the peak values of color matching functions are normalized and the color filter is divided into three. As the color matching function of X has two local maximums, there is a problem in regard to the color matching function of X that the spectral intensity having small local maximum of 400 to 500 nm cannot stably be measured in comparison to the spectral intensity having larger local maximum of 500 to 700 nm. In particular, plenoptic cameras that capture a plurality of spectrum images at a time have divided pupils and tend to have lower light quantity compared with ordinary cameras.

In general cameras, an image is formed at a sensor with the light quantity that corresponds to the diameter of an aperture (i.e. the diameter of a lens stop) of a camera. By contrast, in plenoptic cameras, an aperture is divided into four in the present example embodiment. Accordingly, the light quantity of each band that is received at a sensor is equal to or less than a quarter in plenoptic cameras, compared with ordinary cameras. For this reason, when a black color or dark portion is to be measured, it is difficult to stably measure the spectrum intensity of a filter in regard to the color matching function of X, due to a sensor noise or the like. The instability of spectral intensity affects the precision of measured values.

In the present example embodiment, the four peak curves of the color matching functions of the CIE are separately measured, and the maximum transmittance of all the peak curves is increased.

The spectral characteristics of a first color filter 26a($F_{X1}$) has the local maximum at 440±10 nm, and its full width at half maximum (FWHM) is 45±10 nm. The spectral characteristics of a second color filter 26c($F_Z$) has the local maximum at 445±10 nm, and its FWHM is 50±10 nm. The spectral characteristics of a third color filter 26b($F_Y$) has the local maximum at 555±10 nm, and its FWHM is 100±10 nm. The spectral characteristics of a fourth color filter 26a'($F_{X2}$) has the local maximum at 600±10 nm, and its FWHM is 80±10 nm.

According to this configuration, the spectral intensity (x1 filter) having small local maximum of 400 to 500 nm can stably be obtained together with the spectral intensity (x2 filter) having larger local maximum of 500 to 700 nm, in regard to the color matching function of X. Table 1 shows the results of measurement with three-filter configuration, and results of measurement with four-filter configuration.

TABLE 1

<Comparison of Measurement Accuracy>

|  | Δx | Δy | Δz |
|---|---|---|---|
| Measurement Accuracy in Three-filter Configuration (Mean Value of 24 Colors) | 0.0020 | 0.0024 | 0.0030 |
| Measurement Accuracy in Four-filter Configuration (Mean Value of 24 Colors) | 0.0017 | 0.0020 | 0.0021 |

The results of measurement show the mean values of the measurement accuracy of the color checker with twenty-four colors. The differences between true values and the result of measurement are calculated as Δx, Δy, and Δz, respectively. When the actual values and the result of measurement match, Δx=Δy=Δz=0. Compared with the three-filter configuration, the values of Δx, Δy, and Δz are smaller in the four-filter configuration according to the present example embodiment. This shows improved precision of the four-filter configuration.

Figure 17:
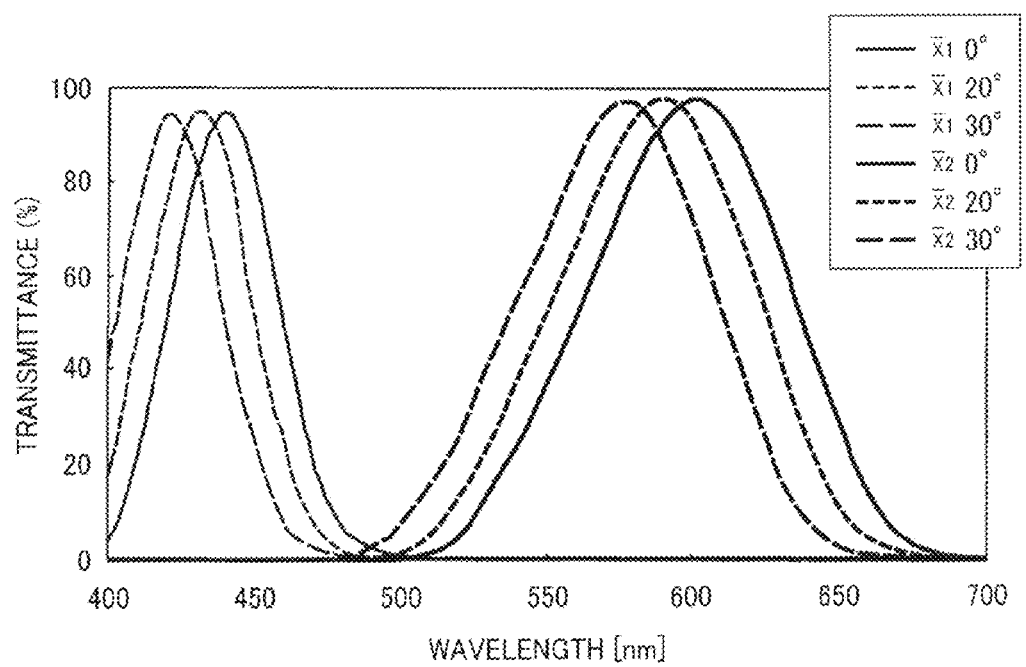
FIG. 17 depicts the dependence of the spectral transmittance of x-color filters on the angle of incidence, according to an example embodiment of the present invention.

In FIG. 14, the color filter 26 is divided into four regions whose sizes are approximately equal to each other. However, the shape of the color filter 26 is not limited to the shape depicted in FIG. 14. The color filter 26 may have a shape other than a circular shape, and may be divided into rectangular regions. Moreover, the dimensions of the divided regions of the filter are not necessarily equal to each other. Because the band-pass capability is realized by interference, the spectral transmittance of the color filters is theoretically dependent on the angle of incidence of the light beam. FIG. 17 depicts the dependence of the spectral transmittance of the color filters 26a($F_{X1}$) and 26b($F_{X2}$) on the angle of incidence, according to an example embodiment of the present invention. The dependence of the spectral transmittance of the color filter 26a($F_X$) on the angle of incidence according to the first embodiment is depicted in FIG. 6. It is seen in both FIG. 6 and FIG. 17 that as the angle of incidence becomes greater, the transmission band shifts to the short wavelength side.

Moreover, compared with a single-peak filter configuration, the number of films in a dielectric multilayer film tends to be greater in a two-peak filter configuration, and this leads to a greater imbalance in a curve as angle of incidence is changed. Accordingly, compared with cases in which normalization is performed by using the peak values of color matching functions, stable measurement of color is achieved at portions including the angle of view in the periphery.

In the second embodiment, four color filters are provided at the stop positions of the main lens 24, and thus the light beams pass through these four color filters that have different spectral transmittance. Here, the angle of the light beam that enters a filter surface varies depending on the height of an object. Such a variation is seen from FIG. 1 where the two main light beams of the light flux originated from two points P and Q on the object 1 pass through the stop of the main lens 24 with different angles. The light beams that have passed through a color filter form an image near a lens array, but then the lens array leads to a different positions of a sensor. In other words, the positions on the surface of sensors (light receiving positions) correspond to the surfaces of the filters through which light beams have passed. Accordingly, it becomes possible to measure tristimulus values X, Y, and Z that are obtained by dividing the light originated from a certain point of the object 1 into three based on the wavelength of the light.

However, as explained with reference to FIG. 17, the spectral transmittance of the color filter 26 has dependence on the angle of incidence. For this reason, the direct use of the output of light receiving elements may lead to precise measurement of the tristimulus values X, Y, and Z of a two-dimensional surface that includes an optical axis thereon, but does not lead to precise measurement of the tristimulus values X, Y, and Z of a two-dimensional surface that does not include an optical axis. In the second embodiment, correction processes are performed with a reference value and a value calculated from a value output from a measuring apparatus, in order to obtain precise tristimulus values of a two-dimensional surface. Generally, such a method is referred to as multiple regression analysis. In multiple regression analysis, an explanatory variable and a target variable are prepared in advance, and correcting processes are performed with a regression matrix obtained from the explanatory variable and target variable.

Figure 18:
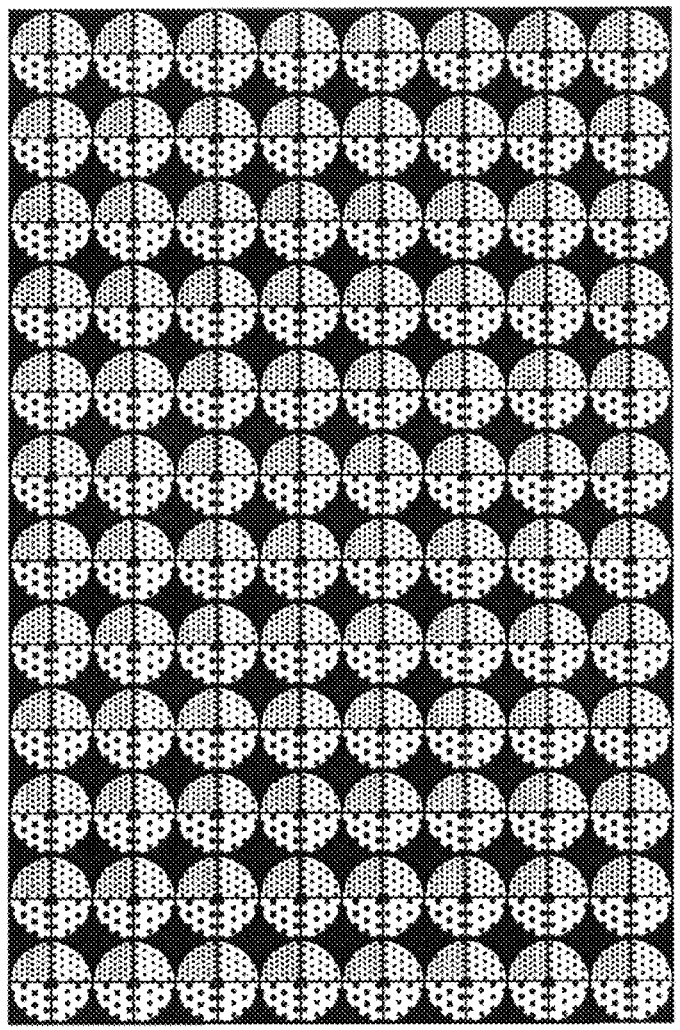
FIG. 18 is a plan view of the image captured by the configuration of FIG. 1.
Figure 19:
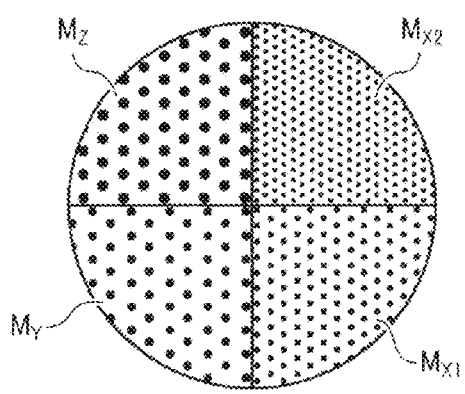
FIG. 19 is a magnified view of a macro pixel that is a part of the image illustrated in FIG. 18.

Next, the procedure is described in detail. Firstly, the procedure for calculating a value output from a measuring apparatus is described. This procedure corresponds to the procedure for calculating an explanatory variable in the multiple regression analysis. FIG. 18 illustrates the image composed of small circles, which is captured by the configuration of FIG. 1. The image consists of circles because the shape of the stop of a single lens is circular. Each of the small circles is herein referred to as a macro pixel. Each macro pixel is formed directly behind each of the lenses that configures a lens array. As illustrated in FIG. 19, the inner structure of a macro pixel corresponds to the structure of a color filter.

The macro pixel in FIG. 19 is reversed left to right and bottom to top with reference to the arrangement depicted in FIG. 14 because the light beam has passed through an optical system. However, the relationship is dependent upon an optical system, and thus the relationship is not limited to the example described above. Inner structures $M_{X1}$, $M_{X2}$, $M_Y$, and $M_Z$ of a macro pixel are formed as the light that has passed through inner structures $F_{X1}$, $F_{X2}$, $F_Y$, and $F_Z$ of the color filter 26 reaches the light receiving element array 6. It is assumed that the value output from the light receiving elements of the inner structures $M_{X1}$, $M_{X2}$, $M_Y$, and $M_Z$ is $v=[v_{X1}, v_{X2}, v_Y, v_Z]^t$. "t" indicates the transpose of a matrix. $v_{X1}$, $v_{X2}$, $v_Y$, and $v_Z$ indicate the output of the inner structures $M_{X1}$, $M_{X2}$, $M_Y$, and $M_Z$, respectively. The value of the output may be obtained by calculating the mean value of the inner structures $M_{X1}$, $M_{X2}$, $M_Y$, and $M_Z$, or may be obtained by selecting one of the light receiving elements of the inner structures $M_{X1}$, $M_{X2}$, $M_Y$, and $M_Z$ and adopting the value of the output of the selected light receiving element as a representative value.

Next, a method of obtaining a reference value is described. This procedure corresponds to the procedure for calculating a target variable in the multiple regression analysis. A color sample that covers a wide range of color space is measured by a device (i.e., reference measuring device) such as a spectroscope for measuring X, Y, and Z values, and these measured values are used as reference values. As a color sample, for example, a so-called color checker on which rectangular twenty-four color samples are arranged is widely adopted. An example of such a color checker is illustrated in FIG. 10.

As described above, FIG. 11 depicts a result of plotting the measured values of the twenty-four colors included in the color checker on an xy-chromaticity diagram. As described above, the color sample is not limited to a color checker. If the objects to be measured are known, colors similar to those of these objects may be adopted as reference values. By so doing, a more accurate result of correction can be obtained. It is assumed that the reference values of X, Y, and Z (tristimulus values) for a certain color sample is $r=[r_X, r_Y, r_Z]^t$.

Next, the flow of correcting processes is described. Firstly, a color sample is measured by using a reference measuring device, and a reference value is obtained. When a color checker with twenty-four colors is used as a color sample, numbers are assigned to these colors. For example, it is assumed that a reference value for the first color is $r_1=[r_{1X1}, r_{1X2}, r_{1Y}, r_{1Z}]^t$. Accordingly, values for $r_1$ to $r_{24}$ are obtained. It is assumed that $R=[r_1, \ldots, r_{24}]$. "R" indicates a matrix of 4 rows and 24 columns. Note that "R" serves as a target variable. Next, a color sample is captured by the measuring apparatus of FIG. 1 to obtain capture data. The capture data is obtained such that one color sample is included in the image. v is obtained from each of the macro pixels. In a similar manner to the reference values, $V=[v_1, \ldots, v_{24}]$ that correspond to the twenty-four colors of the color sample is obtained for each of the macro pixels. Note that "V" serves as an explanatory variable.

Then, a matrix G is obtained from R and V obtained as above.

$$G=RV^t(VV^t)^{-1} \quad \text{[Formula 4]}$$

"G" is also referred to as a regression matrix, and is used for correcting processes. As V has a different value for each of the macro pixels, G is also calculated for each of the macro pixels. The preparation for correcting processes is described in the above.

The flow of actual measuring processes are described below. Firstly, an object to be measured is captured by using the measuring apparatus according to the present example embodiment. Then, an output value for each of the macro pixels included in the captured image is obtained as follows.

$$v_C=[vC_{X1}, vC_{X2}, v_{CY}, v_{CZ}]^t$$

Next, corrected tristimulus values $r_C$ are obtained as in the formula below.

$$r_C=G\,v_C \quad \text{[Formula 5]}$$

Precise tristimulus values on a two-dimensional surface can be obtained by obtaining $r_C$ for each of the macro pixels.

In the flow described above, V or $v_C$ in which output values are directly used are adopted. However, such as extension as below is also possible in a similar manner to Formula 6.

$$v=[v_{X1}, v_{X2}, v_Y, v_Z, 1, v_{X1}^2, v_{X2}^2, v_Y^2, v_Z^2, \ldots]^t \quad \text{[Formula 6']}$$

"..." indicates higher-order terms such as $v_{X1}v_Y$ and $v_{X1}^3$. Such an extension may increase the precision of correction, which leads to more accurate values. When a regression matrix G is obtained by using the extended V, the extended $v_C$ is to be used even when Formula 5 is actually used. The correction processes are similar to those depicted in FIG. 13. According to the measuring method described above, the color of a two-dimensional surface can instantly and precisely be measured.

Figure 20A:
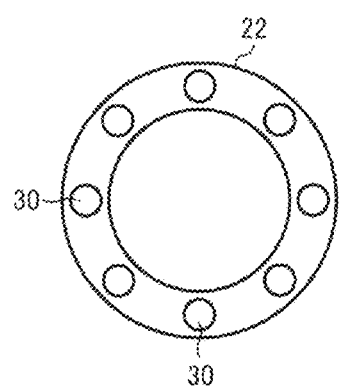
FIGS. 20A and 20B are schematic block diagrams of an example configuration of a measuring apparatus according to an example embodiment of the present invention, where
Figure 20B:
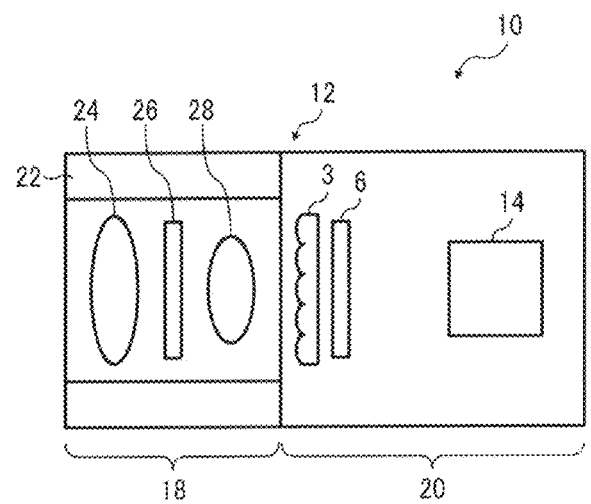

FIGS. 20A and 20B illustrate an example hardware structure of the measuring apparatus 10 according to the example embodiments described above. The measuring apparatus 10 includes an imaging unit 12 that obtains spectral information from an object, and a processing device 14 that generates a plurality of kinds of spectral images based on the spectral information obtained by the imaging unit 12. The processing device 14 also serves as a correction unit that performs the correcting processes to measure colors.

Figure 21:
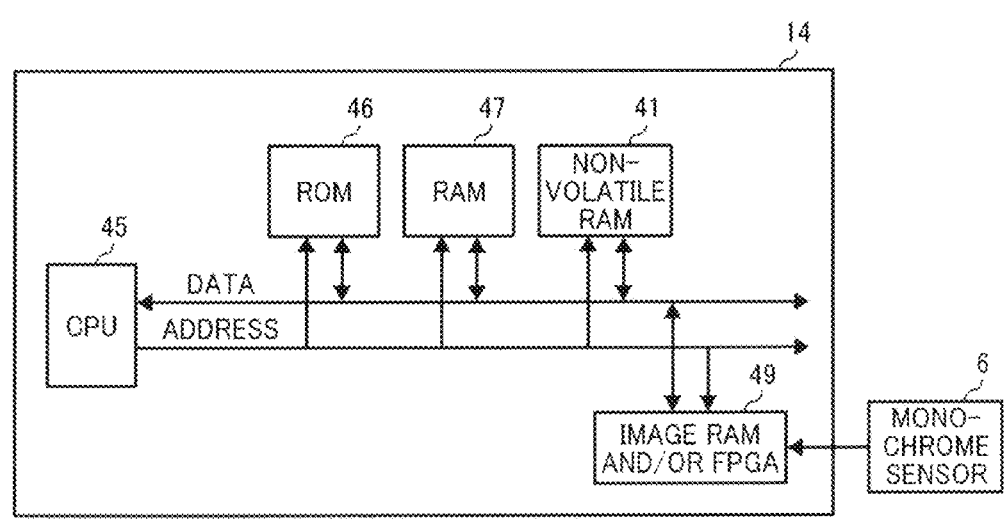
FIG. 21 is a block diagram illustrating the hardware configuration of a processing device according to an example embodiment of the present invention.

FIG. 21 is a block diagram illustrating the hardware configuration of the processing device 14, according to an example embodiment of the present invention. The processing device 14 includes a CPU 45, a read only memory (ROM) 46 in which a program for operating the CPU 45 is stored, a working RAM 47 for storing a program such as a measuring program, a nonvolatile RAM 41 for storing a target variable obtained by measuring a color sample with another reference measuring device, a RAM for temporarily storing the image data obtained by the monochrome sensor 6, and/or a field programmable gate array (FPGA) 49 for processing the image data.

The processing functions (41, 45-47, and 49) depicted in FIG. 21 are realized using software or a combination of hardware and software, based on a program stored in the ROM 46 or the FPGA 49 that is programmed based on the data stored in the ROM 46. In other words, the data obtained by the monochrome sensor 6 is stored in a RAM for imaging, and the CPU 45 performs processing based on the program stored in the ROM 46 to realize processing functions. Alternatively, processing functions are realized using hardware by the FPGA 49 that is programmed to realize the processing functions.

The imaging unit 12 includes a lens module 18 and a camera unit 20, and the camera unit 20 includes the processing device 14. The lens module 18 includes a barrel 22, a main lens 24 arranged inside the barrel 22, a filter 26, and a lens 28.

The camera unit 20 incorporates therein the MLA 3, the monochrome sensor 6, and the processing device 14. The MLA 3 includes a plurality of microlenses that are arranged so as to be orthogonal to the optical axis of the main lens 24. In other words, the MLA 3 is arranged so as to be parallel with the two-dimensional surface of the light receiving element array 6.

At the end of the barrel 22, a plurality of light-emitting diodes (LEDs) 30 are mounted as a light source at regular intervals in the circumference direction. Due to the LED 30 that serves as a light source, spectral information can stably be obtained independently of the condition where an image is captured. The processing device 14 that serves as a correction unit may be replaced with an ASIC. A part of or the entirety of the correction unit may be detached from the main body of the measuring apparatus, and may be electrically connected to the measuring apparatus as necessary.

Figure 22A:
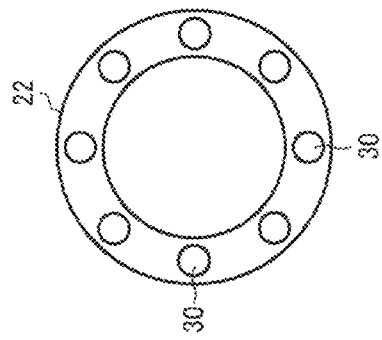
FIGS. 22A and 22B are schematic block diagrams illustrating a front view and a side view of a measuring system according to an example embodiment of the present invention.
Figure 22B:
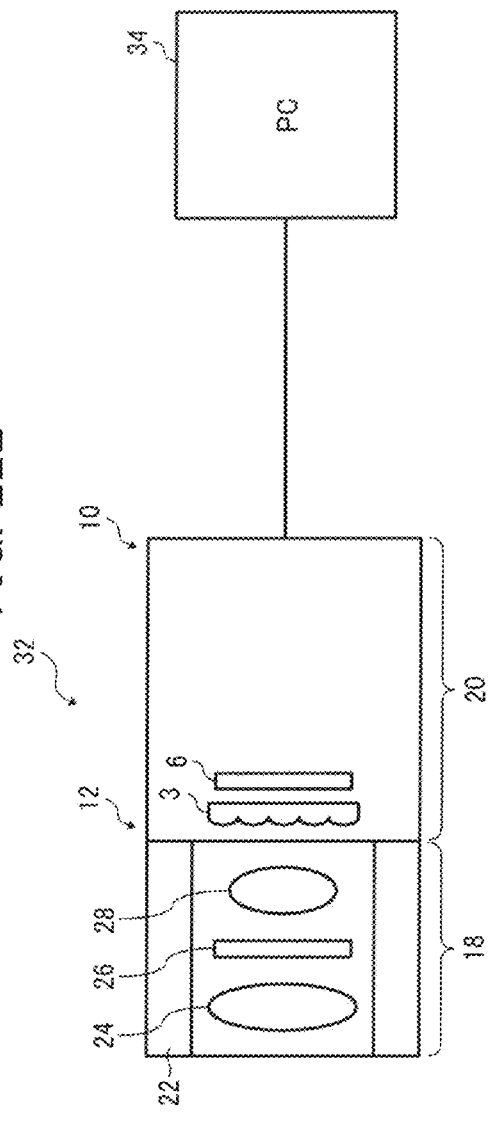
Figure 23:
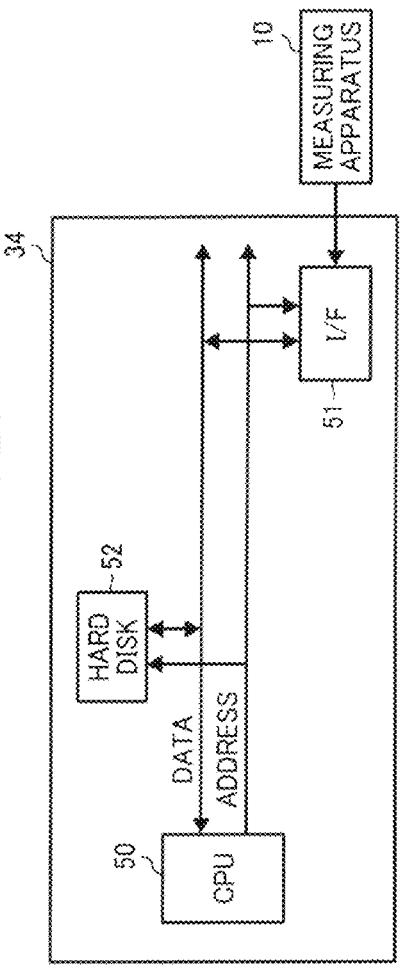
FIG. 23 is a block diagram illustrating the hardware configuration of a personal computer according to an example embodiment of the present invention.

FIGS. 22A and 22B illustrate a measuring system according to an example embodiment of the present invention. A measuring system 32 includes the measuring apparatus 10 and a personal computer (PC) 34 that serves as a determination unit to make a determination based on the data obtained by the measuring apparatus 10. FIG. 23 is a block diagram illustrating the hardware configuration of the PC 34, according to an example embodiment of the present invention. The PC 34 includes a CPU 50 and a hard disk 52, and the hard disk 52 stores a program used to operate the CPU 50, a target variable obtained by measuring a color sample with a different measuring device, or the image data obtained by the measuring apparatus 10 via an interface (I/F) 51.

The processing functions (50, 51, 52) depicted in FIG. 23 are realized by a combination of hardware and software according to a program stored in the hard disk 52. In other words, the data obtained by the measuring apparatus 10 is stored in the hard disk 52, and the CPU 50 performs processing based on the program stored in the hard disk 52 to realize processing functions. The PC 34 uses the software executed by the CPU 50 to perform the correcting processes described above. In other words, the PC 34 also serves as the correction unit. For example, the PC 34 determines whether or not the color to be measured matches a sample color, and displays the result.

Next, the third embodiment of the present invention is described. In the present example embodiment, correcting processes are performed by a model device (design model). The measuring apparatus outputs a quantified value of a color. Firstly, the flow is quantified in which the light emanating from an object to be measured passes through an optical system and turns into an output value of macro pixels. The flow can be expressed as follows.

$$g = S^t r + n \qquad \text{[Formula 9]}$$

g: m*1 column vector that indicates output value of each band r: 1*1 column vector that indicates spectrum of target object S: 1*m matrix, where I-th column indicates spectral-response characteristic of I-th band Superscript t indicates the inversion of the matrix.

In the first embodiment, each macro pixel is divided into three regions as illustrated in FIG. 9. Thus, the data of three bands that correspond to the spectral filters of the color filter 26 is obtained. Accordingly, m=3 in the first embodiment. In the second embodiment, each macro pixel is divided into four regions as illustrated in FIG. 14. Thus, the data of four bands that correspond to the spectral filters of the color filter 26 is obtained. Accordingly, m=4 in the second embodiment. l indicates the number of times sampling is performed (for example, 30 times) in the direction of the wavelength of spectrum to be measured. Assuming that $H = S^t$, Formula 9 can be simplified as a linear system as follows.

$$g = Hr + n \qquad \text{[Formula 10]}$$

H is referred to as a system matrix. A spectrum r of a target object is calculated from a band output value g. However, when m<l as in the present example embodiment, r is not uniquely determined because there are myriad solutions to Formula 10. Such a problem is generally called an ill-posed problem. A minimum norm is often selected as a solution to an ill-posed problem. When a noise can be ignored in Formula 10, a minimum norm is expressed as follows.

$$g = Hr + n \qquad \text{[Formula 10]}$$

$$\hat{r} = H^t (HH^t)^{-1} g \qquad \text{[Formula 11]}$$

The minimum norm obtained in Formula 11 is a continuous spectrum. The following formulas are used to calculate tristimulus values X, Y, and Z from the spectrum.

$$X = k \int r(\lambda) x(\lambda) d\lambda$$

$$Y = k \int r(\lambda) y(\lambda) d\lambda$$

$$Z = k \int r(\lambda) z(\lambda) d\lambda$$

k is a proportionality constant. Y is determined so as to match the brightness. Note that a calibration is usually required by using a measuring device.

As the dependence on the angle of incidence varies among filters, it is apparent that a system matrix varies among macro pixels. For this reason, H is calculated for each macro pixel. When H is calculated for each macro pixel, the angle of incidence of the light beam that corresponds to a macro pixel is calculated, and the spectral transmittance of a filter that has the calculated angle of incidence is used. By so doing, estimation can precisely be performed by using Formula 11. However, a difference in system matrix among macro pixels is not only dependent on the dependence on the angle of incidence of a color filter. In actuality, a difference in system matrix among macro pixels is also dependent on an error in the production of microlenses that configure a lens array, or on a decrease in the light quantity at the periphery of a main lens. For this reason, a multiple regression analysis according to the first and second embodiments leads to more precise correction.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM (read-only-memory), etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

What is claimed is:

1. A measuring apparatus comprising:
    an optical system to condense light;
    a monochrome sensor device to receive light condensed by the optical system at a plurality of light receiving positions and convert the light into an electric signal;
    a plurality of optical band-pass filters arranged near a lens stop of the optical system, each of the optical band-pass filters having a different spectral transmittance;
    a lens array arranged between the optical system and the light receiving device, the lens array including:
        an array including a plurality of lenses each of which is arranged substantially in parallel with a two-dimensional surface of the light receiving device, and
        light shielding on surfaces of the array other than the plurality of lenses to block light; and
    a correction circuit to correct the electric signal for each one of the plurality of light receiving positions of the light receiving device,
    wherein the electric signal for each one of the plurality of light receiving positions is determined as one of an average of a plurality of inner structures of each one of the plurality of light receiving positions or a selected one of the inner structures of each of the light receiving positions, and
    the inner structures of each of the plurality of light receiving positions correspond to the plurality of optical band-pass filters.

2. The measuring apparatus according to claim 1, wherein the correction circuit corrects the electric signal based on a reference value and a value calculated from an output value of the measuring apparatus.

3. The measuring apparatus according to claim 1, wherein the correction circuit corrects the electric signal by using a design model of the measuring apparatus.

4. The measuring apparatus according to claim 1, wherein the correction circuit corrects the electric signal based on a dependence on an angle of incidence of the optical band-pass filter when the correction circuit corrects the electric signal by using a design model of the measuring apparatus.

5. The measuring apparatus according to claim 1, wherein the optical band-pass filters are color filters that process tristimulus values.

6. The measuring apparatus according to claim 5, wherein a spectral transmittance of the color filter is based on color matching functions of an XYZ colorimetric system.

7. The measuring apparatus according to claim 6, wherein a z-filter of the color filters has a greater dimension compared with the remaining color filters.

8. The measuring apparatus according to claim 1, wherein the optical band-pass filter is formed by a dielectric multi-layer film.

9. The measuring apparatus according to claim 1, wherein the optical band-pass filters have four types of spectral characteristics including:
    first spectral characteristic where a local maximum is at 440±10 nm and a full width at half maximum is 45±10 nm;
    second spectral characteristic where a local maximum is at 445±10 nm and a full width at half maximum is 50±10 nm;
    third spectral characteristic where a local maximum is at 555±10 nm and a full width at half maximum is 100±10 nm; and
    fourth spectral characteristic where a local maximum is at 600±10 nm and a full width at half maximum is 80±10 nm.

10. The measuring apparatus according to claim 1, wherein at least part of the correction circuit is detachable from the measuring apparatus.

11. The measuring apparatus according to claim 1, wherein a ratio of a size of each of the plurality of lenses in the lens array to a size of each of the plurality of light receiving positions is between 30:1 and 2:1.

12. The measuring apparatus according to claim 1, wherein the two-dimensional surface of the monochrome sensor device includes a plurality of light receiving elements respectively corresponding to the plurality of lenses of the lens array.

13. A measuring system comprising:
    the measuring apparatus according to claim 1; and
    a determination circuit to make a determination based on data obtained by the measuring apparatus.

14. The measuring system according to claim 13, wherein the determination circuit is a processor, which serves as the correction circuit at least partially.

15. A measuring method, comprising:

condensing light in an optical system;

filtering, by a plurality of optical band-pass filters, the light condensed by the optical system, the plurality of optical band-pass filters being arranged in proximity to a lens stop of the optical system, each of the plurality of optical band-pass filters having a different spectral transmittance;

focusing, by a lens array, the light after filtering by the plurality of optical band-pass filters, the lens array including a plurality of lenses and light shielding on surfaces of the lens array other than the plurality of lenses to block light;

receiving, by a monochrome sensor device, the light after focusing by the lens array, the monochrome sensor device having a plurality of receiving positions, the plurality of lenses of the lens array being substantially parallel to a two-dimensional surface of the monochrome sensor device;

converting, by the monochrome sensor device, the light received by the monochrome sensor device to an electric signal; and correcting, with a correction circuit, the electric signal for each one of the plurality of light receiving positions of the light receiving device, wherein the electric signal for each one of the plurality of light receiving positions is determined as one of an average of a plurality of inner structures of each one of the plurality of light receiving positions or a selected one of the inner structures of each of the light receiving positions, and the inner structures of each of the plurality of light receiving positions correspond to the plurality of optical band-pass filters.

16. The measuring method according to claim 15, further comprising:

separating, with the correction circuit, peak curves of color matching functions of an XYZ colorimetric system to increase maximum transmittance of all peak curves, wherein the optical band-pass filter is a color filter dealing with tristimulus values of color, and the color filter has a spectral transmittance that is based on the color matching functions.

17. The measuring apparatus according to claim 12, wherein a diameter of each of the plurality of lenses of the lens array is larger than a diameter of each of the plurality of light receiving elements of the monochrome sensor device.

* * * * *